United States Patent [19]
Micheli et al.

[11] Patent Number: 5,541,014
[45] Date of Patent: Jul. 30, 1996

[54] INDIRECT-FIRED GAS TURBINE DUAL FUEL CELL POWER CYCLE

[75] Inventors: Paul L. Micheli, Sacramento, Calif.; Mark C. Williams; Frederick A. Sudhoff, both of Morgantown, W. Va.

[73] Assignee: The United States of America as represented by the United States Department of Energy, Washington, D.C.

[21] Appl. No.: 547,094

[22] Filed: Oct. 23, 1995

[51] Int. Cl.⁶ .................................................. H01M 8/06
[52] U.S. Cl. ........................ 429/19; 429/20; 429/26; 429/30; 429/39
[58] Field of Search ............................. 429/19, 20, 24, 429/25, 26, 30, 38, 39, 16, 17, 34

[56] References Cited

U.S. PATENT DOCUMENTS

| | | |
|---|---|---|
| 3,976,507 | 8/1976 | Bloomfield . |
| 4,539,267 | 9/1985 | Sederquist .................. 429/17 |
| 4,738,903 | 4/1988 | Garow et al. . |
| 4,828,940 | 5/1989 | Cohen et al. . |
| 4,921,765 | 5/1990 | Gmeindl et al. . |
| 5,068,159 | 11/1991 | Kinoshita .................. 429/16 |
| 5,198,311 | 3/1993 | Nakazawa et al. . |
| 5,319,925 | 6/1994 | Hendriks et al. ............. 429/17 X |
| 5,449,568 | 9/1995 | Micheli et al. . |

FOREIGN PATENT DOCUMENTS

| | | |
|---|---|---|
| 62-80968 | 4/1987 | Japan . |
| 63-216270 | 9/1988 | Japan . |

*Primary Examiner*—Anthony Skapars
*Attorney, Agent, or Firm*—David E. Breeden; Stephen D. Hamel; William R. Moser

[57] ABSTRACT

A fuel cell and gas turbine combined cycle system which includes dual fuel cell cycles combined with a gas turbine cycle wherein a solid oxide fuel cell cycle operated at a pressure of between 6 to 15 atms tops the turbine cycle and is used to produce $CO_2$ for a molten carbonate fuel cell cycle which bottoms the turbine and is operated at essentially atmospheric pressure. A high pressure combustor is used to combust the excess fuel from the topping fuel cell cycle to further heat the pressurized gas driving the turbine. A low pressure combustor is used to combust the excess fuel from the bottoming fuel cell to reheat the gas stream passing out of the turbine which is used to preheat the pressurized air stream entering the topping fuel cell before passing into the bottoming fuel cell cathode. The $CO_2$ generated in the solid oxide fuel cell cycle cascades through the system to the molten carbonate fuel cell cycle cathode.

12 Claims, 1 Drawing Sheet

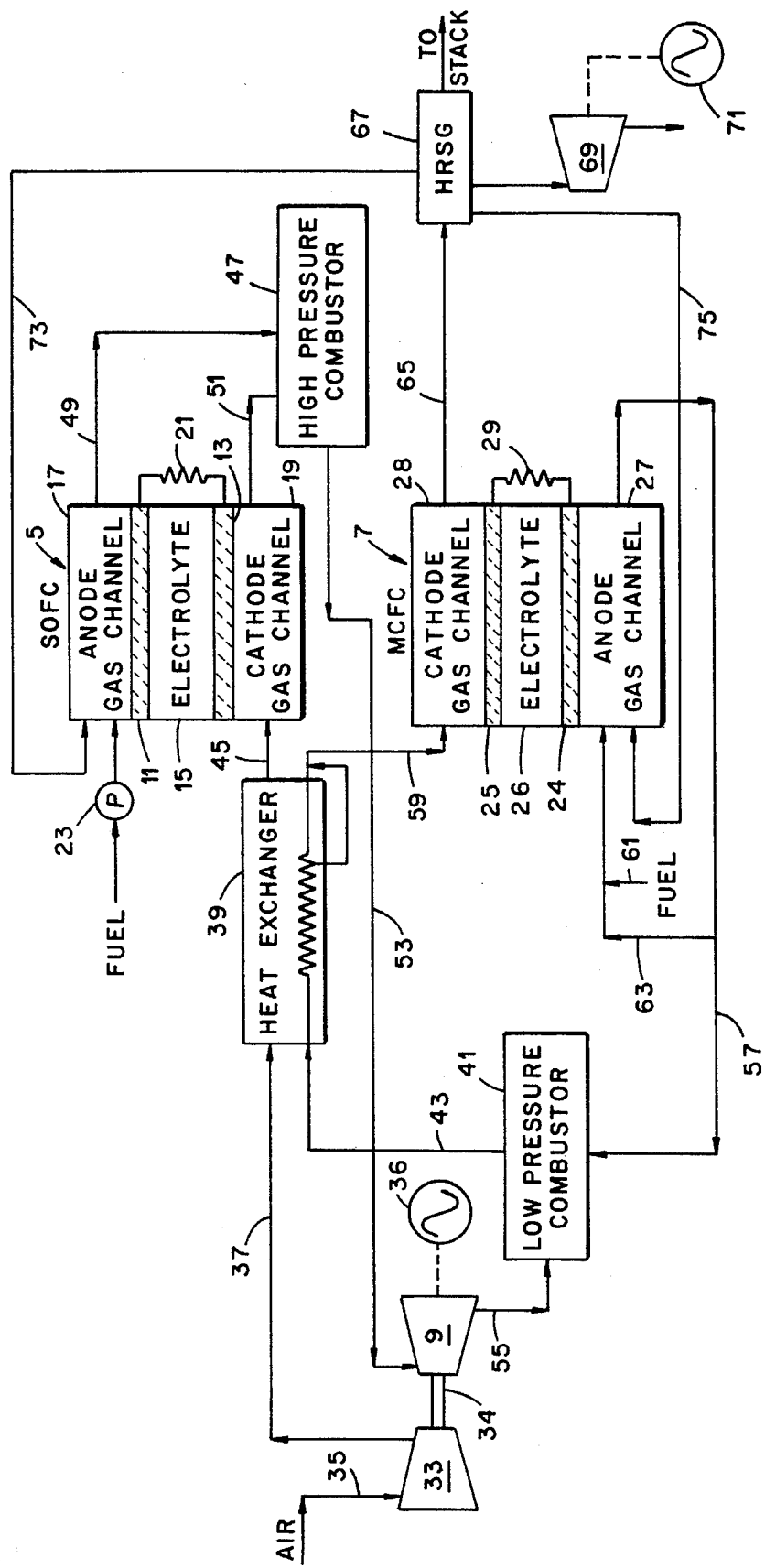

INDIRECT-FIRED GAS TURBINE DUAL FUEL CELL POWER CYCLE

The United States Government has rights in this invention pursuant to the employer-employee relationship between the United States Department of Energy and the inventors.

BACKGROUND OF THE INVENTION

The present invention relates generally to an integrated fuel cell power plant, and more specifically to a combination of cycles wherein a first fuel cell cycle tops an indirect-fired gas turbine cycle and a second fuel cell cycle bottoms the gas turbine cycle so that the cycles are thermally integrated in a tandem operating arrangement.

Gas turbines and fuel cells are well known mechanisms used for the production of electric power. Gas turbine cycles and fuel-cell cycles have each been previously bottomed with steam turbine cycles for the co-generation of electric power. With cycles employing a fuel cell, to pressurize the system, compressors have been used to provide a stream of pressurized air to the cathode of the fuel cell. Full advantage was not taken of the pressurized air until assignee's U.S. Pat. No. 5,449,568 referenced hereinbelow, wherein the air stream is heated with the exhaust stream from a molten carbonate fuel cell bottoming a gas turbine. To enhance fuel cell performance, carbon dioxide is added to the air stream with the resulting mixture undergoing an electrochemical reaction with fuel introduced at the anode of the fuel cell. The fuel cell produces electrical energy and provides streams of hot gases used for generating steam for a bottoming steam turbine cycle that is coupled to a suitable electric generator.

A variation of such a combined cycle includes a fuel cell bottomed with a gas turbine instead of the steam turbine cycle so that residual heat energy in the cathode exhaust stream can be directly extracted in the gas turbine for the production of electric power. Such a system is described in assignee's U.S. Pat. No. 4,921,765 to Gmeindl et al which issued May 1, 1990 and is incorporated herein by reference thereto.

In another variation of gas turbine and fuel cell combined cycles, a direct-fired gas turbine cycle is combined with a fuel cell cycle for producing the hot gas stream used for driving the gas turbine and thereby providing generation of electric power in both the gas turbine cycle and the fuel cell cycle.

While these previously known combined cycles do provide for the co-generation of electric power, these systems have not been found to be capable of providing power conversion at high efficiencies. The primary reason for this short-coming is that presently available fuel cells, such as molten carbonate fuel cells as described in assignees aforementioned patent, can only operate at pressures up to about six atmospheres so as to provide turbine-driving gas streams at pressures less than required for efficient operation of a gas turbine.

In an effort to improve the efficiency of these types of combined cycles, an indirect-fired gas-turbine cycle was bottomed with a molten carbonate fuel-cell (MCFC) cycle wherein the gas turbine is operated at optimum pressure for efficient power conversion. In this combined cycle arrangement, the gas turbine is driven with indirectly heated air at a pressure appropriate for efficient operation of the turbine, while the turbine exhaust, which is at a pressure considerably less than that at the gas turbine inlet, is directly utilized in the fuel cell cycle for the electrochemical reaction. Such a system is described in assignees U.S. Pat. No. 5,449,568 issued Sep. 12, 1995 to Micheli et al and is incorporated herein by reference thereto.

The system of the above referenced patent application includes a compressor for providing a stream of compressed, preheated air to the gas turbine. The compressed air is heated in an indirect heat exchanger which is supplied with a stream of heated gases from a combustor to which auxiliary fuel is supplied along with the exhausts from the molten carbonate fuel cell electrode chambers. The cathode chamber inlet of the fuel cell is connected to the gas turbine exhaust to receive the stream of heated air discharged therefrom. The main fuel feed is supplied to the anode chamber inlet of the fuel cell in the form of a gaseous hydrocarbon fuel, such as fuel gas or natural gas. This fuel is internally reformed into hydrogen and CO at the cell anode for effecting the electrochemical reaction with the stream of heated air supplied to the cathode thereof for the galvanic production of electrical energy. The heated gases at the anode and cathode exhausts are used to provide at least a portion of the heat for the incoming pressurized air stream in the heat exchanger.

To produce sufficient $CO_2$ for the operation of the MCFC, a portion of the hot gas stream from the cathode is combined in a suitable catalytic reactor with the stream of hot gases, including residual fuel values from the anode, for the production of carbon dioxide. The carbon dioxide in the discharge stream of hot gases from the catalytic reactor is separated in a $CO_2$ separator and mixed with the hot air stream discharged from the gas turbine and fed to the cathode reaction chamber of the fuel cell.

The heat value from the stream of the heated gases that are discharged from the heat exchanger can be further utilized for power generation in various ways to further improve the system efficiency. Also, by using the hot exhaust gases from the fuel cell for partially heating the compressed air in the heat exchanger of the gas turbine cycle, about 35–40% of the heat required to raise the compressed air at the inlet to a suitable gas turbine operating temperature, in the range of about 1600° to 2600° F., is provided. This arrangement considerably reduces the fuel requirement for heating the compressor discharge air to the desired gas turbine inlet temperature.

Although many hardware limitations are overcome by using an indirect-fired gas turbine cycle bottomed with a fuel cell cycle as compared to a fuel cell cycle bottomed with a steam turbine cycle, there remain inefficiencies in these types of combined cycles in that additional fuel must be supplied to the system for thermal powering and the requirement of an anode-to-cathode recycle system to produce $CO_2$ required for the molten carbonate fuel cell cathode reaction. Thus, there is a need for a fuel cell integrated power generation system with improved thermal integration and higher operating efficiencies.

SUMMARY OF THE INVENTION

In view of the above need, it is an object of this invention to provide an improved fuel cell integrated power generation system.

Another object of this invention is to provide an improved fuel cell integrated power generation system which requires no supplemental fuel for thermal powering.

Further, it is an object of this invention to provide an improved thermally integrated power generation system as in the above object in which a turbine cycle is topped with a solid oxide fuel cell (SOFC) and bottomed with an MCFC.

Yet another object of this invention is to provide an improved fuel cell integrated power generation system as in the above object in which the $CO_2$ necessary for operation of the MCFC is generated in the SOFC topping the turbine cycle and cascaded through the system to the MCFC cathode.

In summary, this invention relates to a fuel cell and gas turbine combined cycle system which includes dual fuel cell cycles combined with a gas turbine cycle wherein a first fuel cell cycle tops the turbine cycle and is used to produce $CO_2$ for a second fuel cell cycle which bottoms the turbine and is operated at essentially atmospheric pressure. The first fuel cell cycle is operated at a pressure in the range of from about 6 to 15 atms. Compressed air is heated in an indirect heat exchanger and supplied to the first fuel cell cycle along with a pressurized fuel stream. The heat exchanger is supplied with a stream of heated gases from a low pressure combustor fueled by the excess fuel effluent from the second fuel cell cycle. The effluents from the first fuel cell cycle are fed to a high pressure combustor in which the excess fuel is burned to raise the pressurized gas stream to the gas turbine to the desired temperature. The turbine exhaust is fed to the low pressure combustor wherein it is used to burn the excess fuel effluent from the anode of the second fuel cell cycle to provide heat for the input air indirect heat exchanger.

In addition, the heat energy of the effluent from the cathode of the second fuel cell cycle may be utilized in a heat recovery steam generator (HRSG). The HRSG may be used also to provide the necessary water in the form of steam to the fuel cell cycles to promote internal reforming of $CH_4$ fuel to hydrogen.

In a preferred arrangement, a solid oxide fuel cell (SOFC) is uniquely positioned and thermally integrated with the system to not only produce power under desirable conditions, but also to supply the required $CO_2$ for the efficient operation of the downstream fuel cell which is preferably a molten carbonate fuel cell (MCFC). The MCFC is more efficient in converting natural gas to electric power than either the SOFC or the gas turbine, but requires a $CO_2$ source.

Using accepted systems simulations programs, this preferred dual fuel cell and gas turbine combined cycle has been shown to provide a thermodynamically optimized system for electrical power production due to the power generating subsystems being operated in series or tandem and not in parallel. In this case the unused power from the first generating unit, the SOFC, cascades into the second unit, the gas turbine, and the second unit into the third, the MCFC. Since the SOFC operates best at about 2000° F., it has been found to be ideal for the topping position, while the MCFC operates optimally at about 1000° F. and hence as a bottomer to the turbine.

Further, the cycle efficiency of this preferred arrangement is greatly enhanced by adding all of the heat energy obtained from the unreacted hydrogen and carbon monoxide effluent from the fuel cell anode streams to the gas stream ahead of the turbine inlet. This arrangement is a form of recuperation, that is by recycling this energy back to the turbine, the power output of the turbine is increased. Detailed system analyses have shown that this combustor approach is essential to achieving high cycle efficiency. In all known MCFC combined cycles, the unreacted fuel from the anode is recycled back from a combustor to the cathode to provide the $CO_2$ needed. Although these anode-to-cathode recycle streams provide the necessary $CO_2$, they defeat the ability to achieve a high efficiency because the thermal streams are at the wrong temperature for proper cascading.

This thermal tandem arrangement may be optimized to provide a maximized efficiency which has been determined to be in the range of 72–74% (LHV) net. The turbine size may be selected either to optimize the efficiency or to reduce the system costs, or any combination in between. Systems analyses include about 6 percentage points in losses for pressure drop, heat losses and DC to AC power conversion.

BRIEF DESCRIPTION OF THE DRAWINGS

Other objects and many of the attendant advantages of the present invention will become evident to those skilled in the art from the following detailed description taken in conjunction with the drawing wherein the single FIGURE is a schematic block diagram of an integrated dual fuel cell and gas turbine power generation system according to the present invention.

DETAILED DESCRIPTION OF THE INVENTION

As pointed out above and shown in the FIGURE, the preferred fuel cell types used in the combined dual fuel cell and indirect-fired gas turbine cycle of the present invention include a solid oxide fuel cell (SOFC) 5 as the topping unit and a molten carbonate fuel cell (MCFC) 7 as a bottoming unit to the gas turbine 9. Since these fuel cells have been adequately developed, only the main components of these fuel cells, the anode, the cathode and electrolyte, will be illustrated here. Additional information regarding the details of these types of fuel cells may be had by referring to the "Fuel Cells Handbook," January 1994 issued by DOE/METC-94-1006. This reference being incorporated herein by reference thereto.

Referring to the illustrations in the FIGURE, the SOFC 5 includes two porous electrodes 11 and 13 bonded to a solid oxide ceramic electrolyte 15 disposed between them to form a selectively-permeable barrier. The fuel, in the form of hydrogen, is supplied to the anode electrode 11 side of the barrier through an anode gas flow channel 17 while an oxidant, in this case air, is supplied to the cathode electrode 13 side thereof through a cathode gas flow channel 19. Most reactants cannot pass through the barrier, but oxygen ions can flow through the solid oxide lattice. The electrodes are formed of porous electrically conductive metallic or semi-conducting ceramic materials. Typically, the fuel electrode (anode 11) is formed from nickel-zirconia cermet, or the like, the air electrode (cathode 13) is formed from strontium-doped lanthanum manganite, or the like, and the solid oxide electrolyte 15 is formed of yttria-stabilized zirconia, or the like. The cells are typically made in a coaxial cylindrical array and a number of cells are electrically connected in series through a load 21 to form a stack. The SOFC is operated at a temperature in the range of from about 1400° to 2300° F.

Suitable fuels include hydrogen and simple hydrocarbons such as methane $CH_4$. In this application, $CH_4$ is supplied via fuel input line 23 to the anode gas channel 17 of the fuel cell and is internally reformed within this channel by reacting the $CH_4$ with water (i.e., steam) in the presence of the nickel in the anode, which acts as a catalyst. This reaction provides hydrogen for the electrochemical reaction which produces hot streams of reaction gases at the respective electrode gas flow channels. $CO_2$ is produced as a result of this process which is supplied to the MCFC cathode as will be described hereinbelow to provide most of the additional $CO_2$ required for operation of the MCFC 7. The remaining portion being supplied by combustors in the system. Typically, a MCFC requires an oxidant containing a ratio of $CO_2$ to $O_2$ of about 2:1 for the stoichiometry of the electrochemical reaction. Since air does not have this ratio, additional $CO_2$ must be added to the cathode reaction chamber for the cell to operate efficiently.

Generally, the MCFC 7 includes an anode electrode 24 formed of porous nickel or the like separated from a cathode electrode 25 of porous nickel oxide or the like by a molten electrolyte 26 formed of an alkali metal carbonate and mixtures thereof contained within a porous ceramic matrix, commonly made of lithium aluminate ($LiAlO_2$). The MCFC cells are usually made in a layered array and a number of cells are electrically connected in series through a load 29 to form a stack.

With the electrolyte heated to a molten state, a fuel such as hydrogen, derived from fuel gas or natural gas through internal reforming, as described above, at the anode undergoes an electricity-producing electrochemical reaction with oxygen at the cathode. This electrochemical reaction also produces hot streams of reaction gases at the anode and cathode gas channels which are utilized in the combined cycle system as will be described. The MCFC is operated at a temperature in the range of from about 1000° to 1150° F.

The indirect-fired gas turbine 9 is coupled to a compressor 33 by a drive shaft 34 and to an electric generator 36. The compressor may be of any suitable type capable of receiving a stream of air 35 at the inlet thereof and compressing this stream of air to a pressure in the range of about 6 to 25 atms and to a temperature in the range of about 300° to 800° F. This stream of compressed air is passed through conduit 37 into a heat exchanger 39 wherein the compressed air stream is indirectly heated by a hot gas stream from a low pressure combustor 41 through a conduit 43 connecting the output of the combustor to the heat transfer element input of the heat exchanger 39. Although the flows as illustrated in the drawing are co-current, the heat exchange means is preferably counter-current or cross-current. The compressed air is heated to a temperature in the range of about 1500° to 2500° F., preferably about 2000° F. The heat exchanger 39 may be of any suitable type capable of heating the compressed air to the desired temperature range. Preferably, the heat exchanger 39 is formed of high temperature metal and/or a ceramic material due to the relatively high temperature requirements. The hot compressed air stream discharged from the heat exchanger 39 is conveyed through conduit 45 to the cathode gas channel 19 of the SOFC 5.

Along with the heated air supplied to the cathode gas channel 19 of SOFC 5, the fuel $CH_4$ is introduced through a pump 23 to the anode gas channel 17 at a pressure consistent with the operating pressure of the SOFC, in this case about 5–20 atms. The $CH_4$ reacts with water in the form of steam, which may be introduced into the channel in various ways as will be described in one example herein below, in the presence of a catalyst such as nickel present in the anode 11 structure to produce the hydrogen required for the anode reaction and $CO_2$. Alternatively, the fuel may be reheated by passing the fuel stream through a heat exchanger heated by the anode exhaust stream.

The hydrogen reacts electrochemically with oxygen supplied to the cathode gas channel 19 in the preheated, compressed air stream entering the cathode channel. This electrochemical reaction produces both electricity and water.

At the operating temperature of the cell, in the range of from about 1400° to 2300° F., the water is quickly converted to steam which aids in reforming of the $CH_4$ within the anode channel. However, since neither all of the $H_2$ at the anode nor all of the $O_2$ at the cathode is reacted, the excess flows out of the anode and cathode gas channels along with the water and $CO_2$ in the anode stream and the remaining components of the air stream in the cathode stream.

The effluents from the anode and cathode gas flow channels 17 and 19, respectively, of the SOFC are conveyed to a high pressure combustor 47 via conduits 49 and 51, respectively. The high pressure combustor operating at the SOFC 5 operating pressure provides additional heat to the pressurized hot gas stream being fed to the turbine 9 inlet via conduit 53 connected between the output of the combustor 47 and the turbine inlet. The high pressure combustor may take various forms in which the unreacted $H_2$ and CO from the SOFC 5 anode channel 17 is combusted in the presence of $O_2$ from the cathode channel 19 to further heat the hot gas stream. This further heated hot gas at a temperature in the range of about 1800° to 2300° F., preferably about 2200° F., is fed to the turbine 9 at a pressure of about 5 to 20 atms, preferably about 10 atms to operate the turbine and in turn compress the input air stream and generate electricity in the generator 36. The operating gas temperature for the turbine may be altered by changing the amount of fuel fed to the SOFC anode. It may be required to add excess fuel and cut back on the fuel utilization of the first fuel cell, thus providing excess fuel to the high pressure combustor and raise the temperature of the gases from the combustor to the gas turbine. This is not necessarily a major detriment to the cycle efficiency because the turbine power will increase as well as the efficiency contribution of the heat engine component to the overall cycle.

The exhaust gas from the gas turbine 9 is at a temperature in the range of about 600° to 1300° F., preferably about 1000° F., and at essentially ambient pressure. This exhaust gas from the turbine is fed via conduit 55 to the low pressure combustor 41 together with the MCFC 7 anode channel exhaust via conduit 57. The unreacted $H_2$ and CO from the MCFC anode exhaust is combusted in the low pressure combustor 41 in the presence of the remaining oxygen available in the turbine exhaust stream 55. This low pressure combustor produces a hot gas stream rich in $CO_2$ cascaded through the system from the SOFC 5 and the high pressure combustor 47. The gas stream is further heated to a temperature in the range of about 1100° to 1400° F., but preferably less than 1350° F. This heated gas stream passes into the heat exchanger 39 via conduit 43, as described above, and out through conduit 59 to the cathode gas channel 28 of the MCFC 7. The temperature of the gas stream from the heat exchanger is in the range of about 1000° to 1150° F., preferably 1100° F., and at a pressure in the range of about 1 to 3 atms. The temperature of this gas stream may be varied by varying the fuel supplied to the MCFC anode 27 or by varying the heat exchange path through the heat exchanger 39, as shown in the drawing.

As the heated air, enriched with $CO_2$, enters the cathode gas channel 28 of the MCFC 7, a gaseous fuel such as fuel gas or natural gas is concurrently conveyed into the anode gas channel 27 of the fuel cell via conduit 61. This gaseous fuel is preferably preheated to a temperature generally corresponding to that of the gas stream delivered to the cathode gas channel 28 so as to assure the liquification of the carbonate electrolyte and thereafter facilitating the continuing electrochemical reaction within the fuel cell 7. The preheating of the fuel to reforming temperature may be accomplished by recycling a portion of the anode exhaust stream to the anode fuel inlet via line 63

With the heated streams of fuel and the $CO_2$-enriched air stream delivered to the fuel cell 7, the electrochemical reaction proceeds as described in assignee's aforementioned patent to generate electrical energy while producing reaction gases formed primarily of $CO_2$ and water at the anode and unreacted $CO_2$, water and vitiated air at the cathode. Typically this gas stream contains about 14% $CO_2$, 3% $O_2$, and 11% $H_2O$, with $N_2$ making up the primarily the remaining portion. The ration of $CO_2$ to $O_2$ should be greater than 2 throughout the cathode flow of the fuel cell. Only the MCFC is operated at vitiated $O_2$ conditions. All of the oxygen supply for the system is provided through the input air stream which contains approximately 23% $O_2$ by Wt. About 12 to 16% by Wt. is consumed by the SOFC 5, while only about 1 to 3 % by Wt. is consumed by each of the combustors 41 and 47, leaving an $O_2$ content of about 5 to 7% by Wt. in the gas stream entering the cathode of the MCFC 7. Approximately, 2 to 3 % by Wt. of $O_2$ is consumed in the MCFC, leaving approximately 3% by Wt. in the exhaust stream from the MCFC cathode.

As shown in the FIGURE, the MCFC 7 cathode exhaust gases, which are at a temperature in the range of about 1000° to 1300° F., usually about 150°–200° F. higher than the temperature of the gas and fuel delivered to the fuel cell 7, may be discharged to the atmosphere, recycled to the low pressure combustor 41, or preferably discharged from the fuel cell via conduit 65 to a utilization cycle such as the heat recovery steam generator (HRSG) 67 cycle shown in the drawing. The hot gas stream 65 is fed into a boiler or the like, not shown, of the HRSG for extracting residual heat energy from these gases while producing steam for use in a steam turbine 69 for the generation of electrical power by a generator 71. Further, the HRSG may be used to provide water, in the form of steam, to the fuel electrodes (anodes) of both fuel cells 5 and 7 via conduits 73 and 75, respectively, at the separate cell operating temperatures, as described above for reforming the $CH_4$ to $H_2$.

By employing the dual fuel cell and indirect-heated gas turbine combination and the steam turbine cycle, as described above, the resulting electrical power generation sources provide an increase in the overall cycle efficiency of about 6% over any known combination of a fuel-cell cycle bottomed or topped by a gas turbine cycle or by a direct-heated gas turbine cycle employing a fuel cell cycle.

In another modification of the present invention, the MCFC 7 may be operated at an intermediate pressure greater than atmospheric, such as in the order of about two to five atmospheres, the cathode exhaust stream will be at a pressure adequate to drive a low-pressure turbine under pressurized conditions. This will reduce the size and cost of the MCFC. The low-pressure turbine exhaust can be used to heat water in a boiler to boiling temperature with the steam generated at an intermediate pressure of the low pressure turbine. This converts the gas turbine into a low pressure power generator and effectively eliminates the need of a steam turbine system following the MCFC. While the cycle efficiency is not as high as in the preferred embodiment described above, this approach reduces the balance of plant significantly and serves to reduce system costs.

It will be seen that the combined cycle of an indirect-fired gas turbine cycle topped and bottomed with a fuel cell cycle and further employing a steam turbine cycle together provide a significant improvement in combined cycle technology which operates at a relatively high efficiency as compared to previously known combined cycles such as described above. Also, by cascading the air flow through the system without shunting any of the pressurized air that runs the turbine to burn the excess hydrogen from the fuel cells, more power and hence higher efficiency is achieved.

What is claimed is:

1. A gas turbine and dual fuel cell combined cycle power generation system, comprising:

an off-base fired gas turbine have a gas inlet means for receiving a heated, pressurized gas stream to drive said turbine and a gas exhaust means for providing an exhaust gas stream therefrom;

a compressor means for generating a stream of pressurized air at a pressure corresponding to the pressure of said pressurized gas stream of said turbine;

a first fuel cell capable of operating at a temperature and pressure corresponding to said pressurized gas stream and including a cathode means for receiving said stream of pressurized air from said compressor means, an anode means for receiving a first fuel stream at a pressure corresponding to the pressure of said operating gas stream, and means for reacting a portion of said first fuel stream with said stream of pressurized air to produce electric power and heated cathode and anode off gas streams for supplying said pressurized gas stream to said gas inlet means of said gas turbine; and a second fuel cell capable of operating at a temperature and pressure corresponding to the exhaust gas stream of said turbine and including a cathode means for receiving said exhaust gas stream from said turbine, anode means for receiving a second fuel stream, and means for reacting a portion of said second fuel stream with said exhaust gas stream from said turbine to produce electricity and separate anode and cathode streams of heated exhaust gases.

2. The gas turbine and dual fuel cell combined cycle power generation system as set forth in claim 1 further including a high pressure combustor means operably connected to the cathode and anode means of said first fuel cell and between said gas inlet means of said gas turbine for combusting all of a remaining portion of said first fuel stream contained in the anode exhaust stream of said first fuel cell to further heat said pressurized gas stream driving said gas turbine.

3. The gas turbine and dual fuel cell combined cycle power generation system as set forth in claim 2 wherein said first fuel cell means is a solid oxide fuel cell and said second fuel cell means is a molten carbonate fuel cell and further including an indirect heat exchange means for heating said stream of compressed air by means of indirect heat exchange with a stream of heated gases conveyed through a heating channel thereof to a temperature corresponding to a selected operating temperature of said solid oxide fuel cell so that said heat exchange means equilibrates the thermal requirements of said first and second fuel cells operated at different temperatures.

4. The gas turbine and dual fuel cell combined cycle power generating system as set forth in claim 3 further including a low pressure combustor means operably connected to receive the exhaust gas stream from said turbine and the exhaust gas stream from said anode means of said second fuel cell for combusting a remaining portion of said second fuel stream contained in the anode exhaust stream of said second fuel cell to heat said exhaust gas stream from said gas turbine and apply said exhaust gas stream from said turbine to said heating channel of said heat exchanger to heat said pressurized air stream and conduit means connected between an output of said heating channel of said heat exchanger and the cathode means of said second fuel cell means.

5. The gas turbine and dual fuel cell combined cycle power generation system as set forth in claim 4 wherein said compressor means includes a compressor driven by said gas turbine.

6. The gas turbine and dual fuel cell combined cycle power generating means as set forth in claim 4 wherein said first and second fuel cells are of the internal fuel reforming type wherein fuel gas reforming is integrated with the anode means thereof and wherein said first and second fuel gas streams are composed of $CH_4$.

7. The gas turbine and dual fuel cell combined cycle power generating system as set forth in claim 6 further including a pumping means for pressurizing said first fuel gas stream applied to the anode of said solid oxide fuel cell to a pressure corresponding to the pressure of said pressurized air stream supplied to the cathode thereof.

8. The gas turbine and dual fuel cell combined cycle power generating system as set forth in claim 7 further including recycle conduit means for recycling a portion of the anode exhaust gas stream of said second fuel cell to be mixed with said second fuel gas stream prior to introduction into said anode means to heat said second fuel stream to reforming temperature and steam generating means for applying steam to the anode means of each of said first and second fuel cells at the corresponding operating temperatures thereof to provide the water necessary for reforming of the fuel streams therein.

9. The gas turbine and dual fuel cell combined cycle power generating system as set forth in claim 8 wherein the first fuel cell is operated at a temperature in the range of about 1400° to 2300° F. and at a pressure in the range of from about 5 to 20 atms, the heated gas stream at the inlet to said gas turbine is at a temperature in the range of from about 1800° to 2300° F. and at a pressure in the range of from about 5 to 20 atms, and the second fuel cell is operated at a temperature in the range of from about 1000° to 1150° F. and at a pressure of about 1 to 3 atms.

10. The gas turbine and dual fuel cell combined cycle power generating system as set forth in claim 9 wherein the gas stream introduced into the cathode of the second fuel cell is enriched in $CO_2$ generated in the anode means of the first fuel cell and in said high and low pressure combustor means.

11. The gas turbine and dual fuel cell combined cycle power generating system as set forth in claim 10 further including a heat recovery power generating means operably connected to receive the hot gas steam from the cathode means of the second fuel cell for the further generation of power therefrom.

12. An indirect-fired gas turbine cycle topped and bottomed with a fuel cell cycle for combined generation of electrical power, comprising:

a compressor means for providing a stream of compressed air at an outlet thereof;

a heat exchange means coupled to the outlet of the compressor means for heating said stream of compressed air through indirect heat exchange with a reheated stream of gases passing therethrough;

a first fuel cell means including an anode means for receiving a first stream of fuel gas and a cathode means for receiving the heated stream of compressed air passing out of said heat exchanger;

a first fuel supply means coupled to the anode means of said first fuel cell means for supplying a first stream of fuel thereto, at least a portion of the first stream of fuel at the anode means and the heated stream of compressed air at the cathode means undergoing an electrochemical reaction within the fuel cell means for producing an electrical output while generating streams of heated gases at the anode means and the cathode means;

a first combustor means connected to receive the streams of heated gases from said anode means and said cathode means of said first fuel cell means for combusting the remaining portion of fuel in the stream of heated gases from the anode means of the first fuel cell means to further heat the pressurized gas stream passing therethrough to an output thereof;

a gas turbine means having a pressurized gas intake and a low pressure exhaust and including an electric generator driven thereby for receiving said pressurized gas stream from the output of said first combustor means at said intake thereof to drive said turbine;

a second fuel cell means including an anode means and a cathode means;

a second fuel supply means coupled to the anode means of said second fuel cell means for supplying a second stream of fuel thereto, at least a portion of the second stream of fuel at the anode means of said second fuel cell means undergoing an electrochemical reaction with a stream of reactant gases at said cathode means of said second fuel cell means for producing an electrical output while generating further streams of heated gases at the anode means and cathode means, respectively, of said second fuel cell means;

a second combustor means connected to receive the further stream of heated gases and the low pressure exhaust from said turbine means for combusting the remaining portion of fuel from said anode means of said second fuel cell means to provide said reheated stream of gases to said heat exchanger; and conduit means for passing said reheated stream of gases through said heat exchanger into the cathode means of said second fuel cell means.

\* \* \* \* \*